(No Model.)
B. A. FISKE.
STEERING APPARATUS FOR VESSELS.
No. 385,259. Patented June 26, 1888.
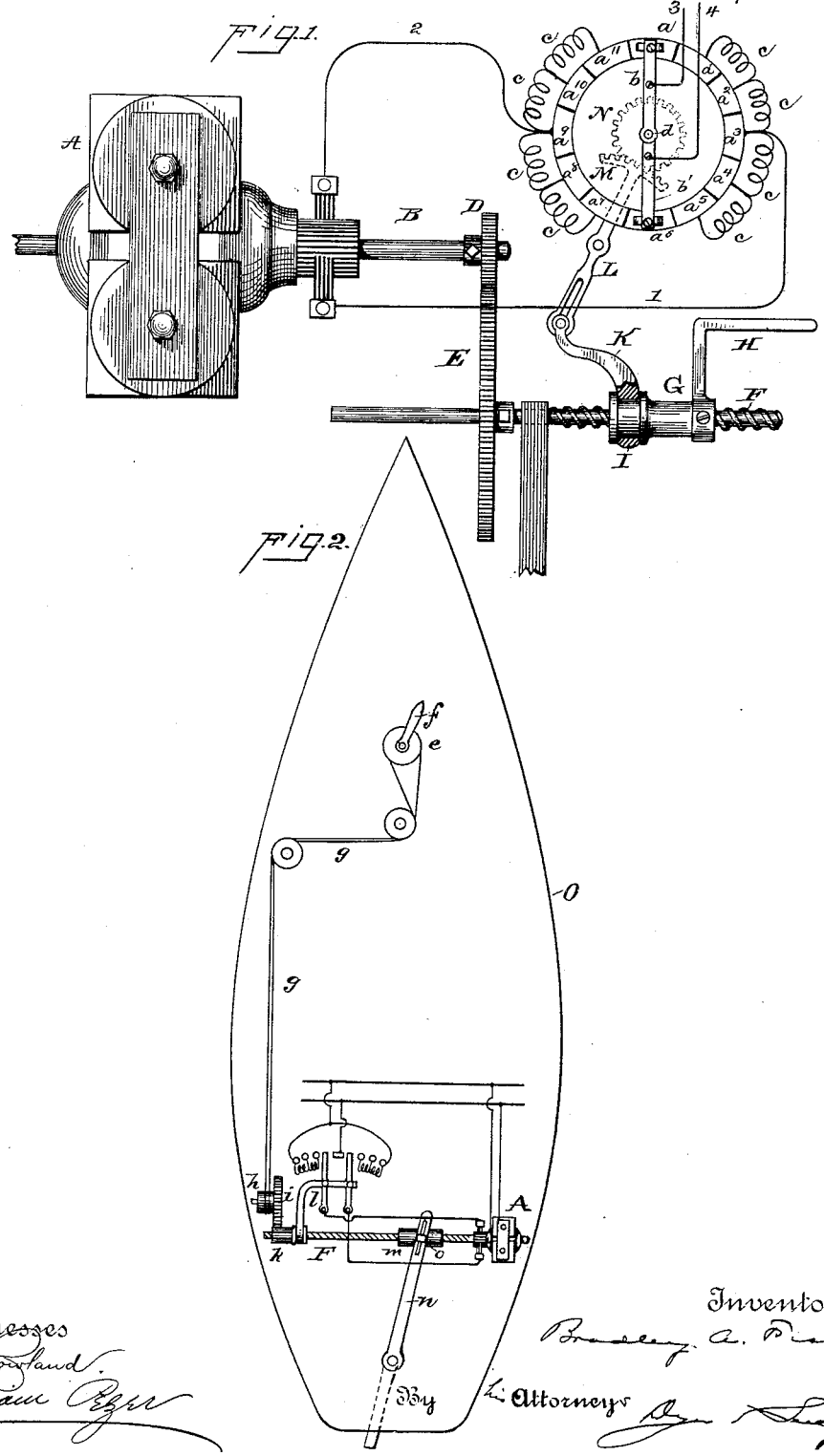
Witnesses
Inventor,
Bradley A. Fiske.
By Attorneys

UNITED STATES PATENT OFFICE.

BRADLEY A. FISKE, OF THE UNITED STATES NAVY.

STEERING APPARATUS FOR VESSELS.

SPECIFICATION forming part of Letters Patent No. 385,259, dated June 26, 1888.

Application filed February 4, 1888. Serial No. 263,051. (No model.)

*To all whom it may concern:*

Be it known that I, BRADLEY A. FISKE, of the United States Navy, and a citizen of the United States, have invented a certain new and useful Improvement in Steering Apparatus for Vessels, of which the following is a specification.

My invention relates mainly to the use of electric motors for operating the rudder in steering vessels, although certain features which I employ in the regulation of the motor are applicable also to motors used in other situations and for other purposes.

In my invention I make use of the general principle set forth in my application filed June 27, 1887, of causing the motor to follow the movements of hand-operated mechanism, whereby the variations in speed and direction of rotation of the motor are made to correspond to the movements of the hand of the operator. I carry this principle into effect in my present invention by placing upon a screw which is turned by the motor a screw-threaded sleeve which is itself provided or connected with a handle for turning it and which carries or moves a switch-arm whose movement controls or regulates the motor. It will be seen that when the sleeve is turned by the hand, if the screw is stationary, the sleeve will move along the screw. Thus the switch-arm can be moved to start the motor. Then the screw will turn in the direction in which the motor runs, and this will be such as to tend to move the sleeve back to its first position; but so long as the movement of the hand is continued at the same speed the sleeve and the switch-arm will remain still and the motor will continue to run at the same speed; but if the operator quickens or lessens the speed of movement of his hand the sleeve will move along the screw in one direction or the other and will move the regulating switch-arm, so that the speed of the motor will be increased or diminished, as may be required. If the operator stops his movement, the sleeve will be moved by the motor to its normal position, so that the switch-arm will break circuit and stop the motor; and if the operator reverses the direction of his movement the sleeve will move on the screw and change the position of the switch-arm, so as to reverse circuit and cause the motor to run the other way. In applying this to ship-steering I connect the motor-shaft with an arm or tiller, moving the rudder in such manner that said arm will be moved in one direction or the other, according as the motor runs in one direction or the other, and with a rapidity of movement dependent upon the speed of the motor.

The connection between the motor and the tiller which I prefer to employ is somewhat similar to that just described for moving the switch—that is, I use a screw turned by the motor-shaft and a screw-threaded sleeve on said screw, and to which said tiller is attached, whereby said sleeve and the tiller attached thereto are moved along the screw in one direction or the other and rapidly or slowly, according to the direction and speed of movement of the motor.

My invention is illustrated in the accompanying drawings.

Figure 1 shows, partly in diagram, regulating apparatus for an electric motor embodying the principle of my invention; and Fig. 2 illustrates the application thereof to ship-steering.

In Fig. 1, A represents an electric motor, and B its armature-shaft. 1 2 is the armature-circuit, from any suitable source, through a regulating-switch, which is of that well-known character employing a circular series of contacts, $a$ $a'$, &c., a switch-arm consisting of two parts, $b$ and $b'$, movable together upon such contacts and insulated from each other, and with which the supplying-wires 3 and 4 are connected, respectively, the contacts on each side being connected together through resistance-coils $c$ $c$, there being no connection to the contacts $a$ and $a^6$, and the armature-wires 1 2 being connected, respectively, to contacts $a^3$ and $a^9$. By the use of this switch the armature-circuit is open when the arm $b$ $b'$ is on $a$ and $a^6$. It is closed through high resistance in one direction when the arm is on $a^5$ and $a^{11}$ and in the other direction when it is on $a'$ and $a^7$, and the resistance is decreased when it is moved to $a^4$ and $a^{10}$ or to $a^2$ and $a^8$, and the resistance is wholly removed when it is moved to $a^3$ and $a^9$.

Upon the armature-shaft B is a pinion, D, engaging with a large toothed wheel, E, which turns a screw, F. On the screw F is an internally-screw-threaded sleeve, G, which has a handle, H, for turning it by hand, and the sleeve G carries a loose collar, I, from which an arm, K, extends, carrying the pivoted arm L, which terminates in a curved rack, M, engaging with a pinion, N, on the spindle $d$, which carries the switch-arm $b\,b'$. The switch-arm is thus connected with the sleeve G, so as to be moved upon the contacts $a\,a'$, &c., by the longitudinal movement of said sleeve upon the screw F.

In the position shown the motor is at rest, since the switch-arm is at the zero-point on the contacts $a\,a^6$, and the circuit is broken. To start the motor, the operator turns the handle H in one direction or the other, according to the direction in which he wants the motor to run, and the sleeve G is thus moved upon the screw F, turning the switch-arm to, say, the contacts $a'$ and $a^7$, whereby the motor starts in the required direction but slowly, since the full resistance is in circuit. This movement of the motor tends to move the sleeve G back and turn the switch-arm back to its normal position; but the operator continues to turn the handle at the same speed, so as to maintain the same relative speed of the motor and the hand, and the sleeve and switch-arm remain stationary, and the motor runs at the same speed until it has done what is required of it, when the operator, desiring the motor to stop, stops the handle, and the motor then moves the sleeve G, brings the switch-arm back to $a\,a^6$, and stops. If while running in this way the operator wants to run faster, he turns the handle faster, so as move the sleeve against the movement of the motor and bring the switch-arm to the contacts $a^2$ and $a^8$, thus removing resistance from the armature-circuit, so that the motor runs faster, and the operator by continuing his rapid movement keeps the switch-arm stationary and the motor running fast. If it is required to have the motor run the other way, the operator will turn the handle the other way and bring the switch-arm thus to the opposite side of the zero position—that is, to $a^{11}$ and $a^5$—which reverses the circuit through high resistance, and he may vary the speed of the reversed motion or stop it by varying the speed or stopping the motion of his hand. It will be seen that this furnishes a very simple and effective way of regulation for electric motors in which the movements of the motor correspond precisely with those of the operator's hand. It is evident that instead of using the switch to vary the resistance of the armature-circuit it may be employed to vary that of the field-magnet circuit or to vary the number of sections of the field-coils in circuit. The motor shown may have any suitable field-magnet connections. I find this method of regulation particularly suitable for electric motors used in steering vessels, wherein it is required to reverse the movement of the motor to have it run slowly or rapidly and to do these things quickly and readily. My arrangement for this purpose is shown in Fig. 2, where I have shown a switch of somewhat different construction from that in Fig. 1, though it is evident that the latter form can be used as well.

O represents the deck of a vessel. At the place at which the steering is to be performed I place a wheel, $e$, having a handle, $f$, for turning it, and from this wheel extends a chain or cord, $g$, passing to the stern of the vessel and over a drum, $h$, carrying a toothed wheel, $i$, which engages with teeth on a sleeve, $k$, which is screw-threaded internally and placed on the screw F, extending from the shaft of the operating-motor A. The sleeve $k$ carries, by means of a loose collar, as before described, the switch-arm $l$. The switch is similar in principle to that of Fig. 1, having a central position, as shown, at which the circuit is broken, and closing circuit in one direction or the other as it is moved in one direction or the other and cutting out resistance as it is moved farther in either direction. Upon the screw F, I also place a screw-threaded sleeve, $m$, to which is attached the tiller or rudder-arm $n$ by means of a pin, $o$, working in a slot in said arm.

It will be seen that when it is desired to move the tiller $n$ in one direction or the other the handle $f$ is turned, which turns the sleeve $k$ on screw F and moves the switch so as to start the motor in the required direction, and the movement of the motor causes the sleeve $m$ to move on the screw and turns the rudder to the required point, the movement of handle $f$ being continued fast or slow, according to the quickness with which it is desired to move the rudder, and when the rudder has been moved far enough the handle $f$ is stopped and the motor moves the switch-arm back to its central position and stops. To move the rudder the other way, handle $f$ is moved the other way, so as to reverse the motor and cause sleeve $m$ to move the other way on the screw. It will be seen that the helmsman at the handle $f$ will know by the position of said handle what is the position of the rudder at any time, and no matter at what distance he may be from it.

What I claim is—

1. The combination, with an electric motor and a regulating-switch having a movable arm, of a screw turned by the motor, a sleeve on said screw connected with said switch-arm, and a handle for turning said sleeve, substantially as set forth.

2. The combination, with an electric motor and a regulating-switch having a movable arm at whose normal position a circuit to the motor is broken, while movement to one side or the other closes circuit to the motor in one direction or the other, of a screw turned by the motor, a sleeve on said screw connected with said switch-arm, and a handle for turning said sleeve in either direction, substantially as set forth.

3. The combination, with an electric motor and a regulating-switch having a movable arm at whose normal position a circuit to the motor is broken, while movement to one side or the other closes circuit to the motor in one direction or the other and continued movement increases the speed of the motor, of a screw turned by the motor, a sleeve on said screw connected with said switch-arm, and a handle for turning said sleeve in either direction, substantially as set forth.

4. The combination of an electric motor, a rudder-arm connected therewith so as to be moved thereby in either direction, a regulating-switch having a movable arm, a screw turned by the motor, a sleeve on said screw connected with said switch-arm, and a handle for turning said sleeve in either direction, substantially as set forth.

5. The combination, with an electric motor, of a regulating-switch having a movable arm, a screw turned by the motor, a sleeve on said screw connected with said switch-arm, a handle for turning said sleeve, another sleeve on said screw, and a rudder-arm carried by said last-named sleeve, substantially as set forth.

This specification signed and witnessed this 1st day of February, 1888.

BRADLEY A. FISKE.

Witnesses:
WILLIAM PELZER,
E. C. ROWLAND.